United States Patent
Sharp

(10) Patent No.: US 7,898,603 B2
(45) Date of Patent: Mar. 1, 2011

(54) DOUBLE-SHUTTER LENSES WITH COMPENSATORS

(75) Inventor: Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 11/948,832

(22) Filed: Nov. 30, 2007

(65) Prior Publication Data

US 2008/0129899 A1    Jun. 5, 2008

Related U.S. Application Data

(60) Provisional application No. 60/861,709, filed on Nov. 30, 2006.

(51) Int. Cl.
    *G02F 1/1335*      (2006.01)
    *G02B 27/22*      (2006.01)

(52) U.S. Cl. .......................... 349/13; 349/15; 349/119; 359/462

(58) Field of Classification Search ............. 349/13–15; 359/462–477, 480
See application file for complete search history.

(56) References Cited

U.S. PATENT DOCUMENTS

| | | | |
|---|---|---|---|
| 5,196,953 A | | 3/1993 | Yeh et al. |
| 5,519,522 A | * | 5/1996 | Fergason .................. 349/14 |
| 5,598,231 A | * | 1/1997 | Lin ........................... 351/49 |
| 6,028,656 A | * | 2/2000 | Buhrer et al. ............. 349/196 |
| 6,273,571 B1 | * | 8/2001 | Sharp et al. ............... 353/122 |
| 6,278,501 B1 | * | 8/2001 | Lin ............................. 349/13 |
| 6,295,102 B1 | * | 9/2001 | Higa et al. .................. 349/13 |
| 6,417,892 B1 | | 7/2002 | Sharp et al. |
| 6,912,018 B2 | * | 6/2005 | Faris et al. ................. 349/16 |
| 2002/0089629 A1 | * | 7/2002 | Kim et al. ................. 349/117 |
| 2003/0089956 A1 | | 5/2003 | Allen et al. |
| 2005/0264734 A1 | * | 12/2005 | Robinson et al. .......... 349/119 |

OTHER PUBLICATIONS

V Sergan et al. Two Crossed A-Plates as an Alternative to a Negative C-Plate. SID Symposium Digest 31, 838.*
International search report and written opinion of international searching authority for co-pending PCT application No. PCT/US2007/019466 mailed Oct. 16, 2008.
International search report and written opinion of international searching authority in corresponding PCT/US07/86158 mailed May 22, 2008.
International Preliminary Report on Patentability for PCT/US2007/086158 mailed Jun. 11, 2009.

* cited by examiner

*Primary Examiner*—Mark A Robinson
*Assistant Examiner*—Michael Inadomi
(74) *Attorney, Agent, or Firm*—Baker & McKenzie LLP

(57) ABSTRACT

Exemplary embodiments of systems for high-performance compensated shutter lens designs, may include compensators for compensating for performance problems that stem from real-world performance limitations in present shutter-glass designs. In an embodiment, a shutterglass lens may include first and second pi-cells and first and second compensators. The pi-cells and the compensators of the shutterglass lens may be stacked together within the shutterglass lens.

9 Claims, 12 Drawing Sheets

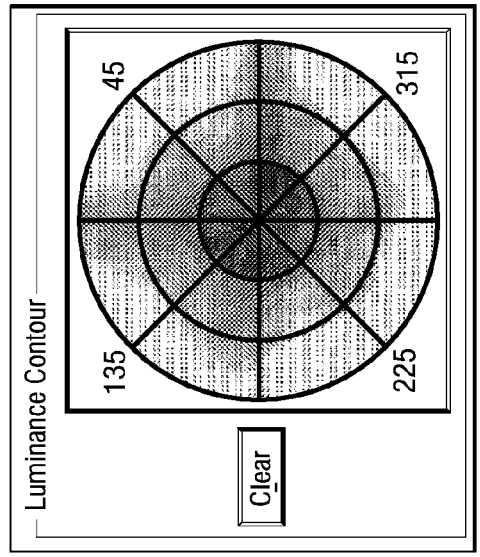
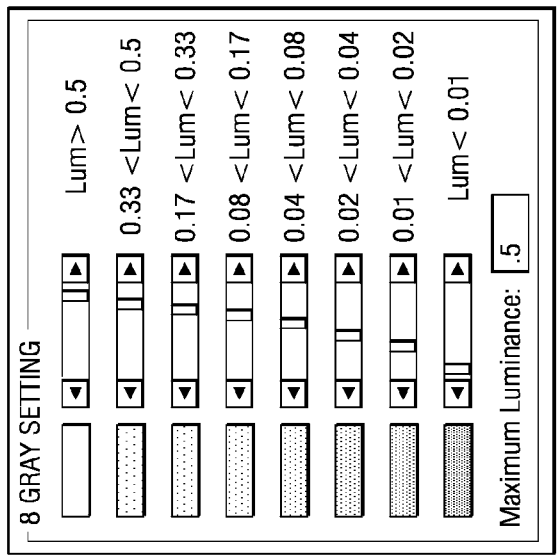
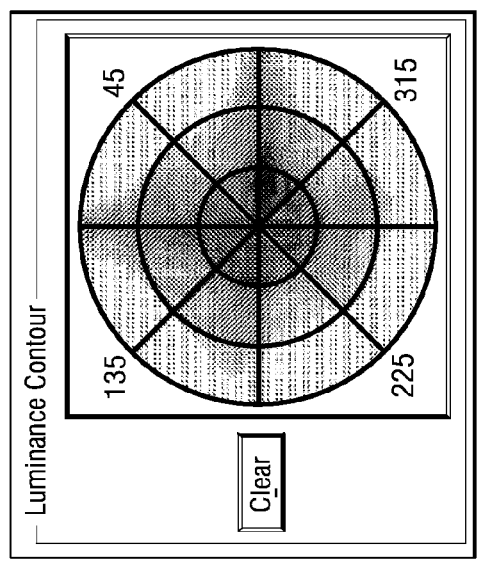
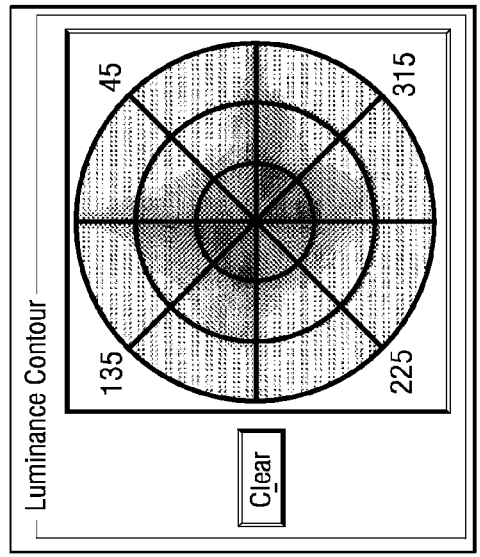
FIG. 9

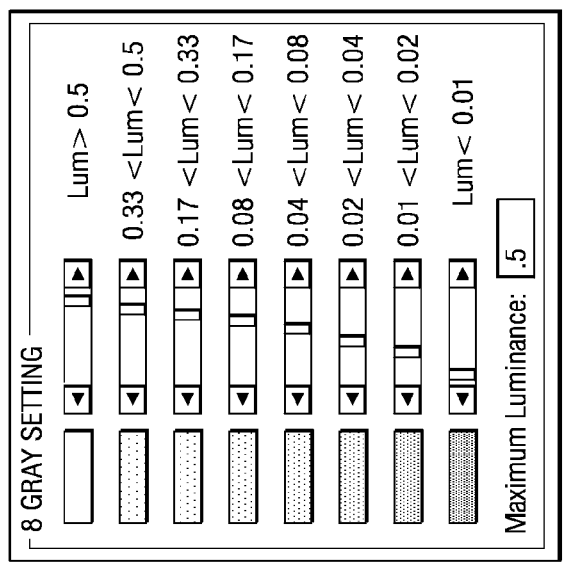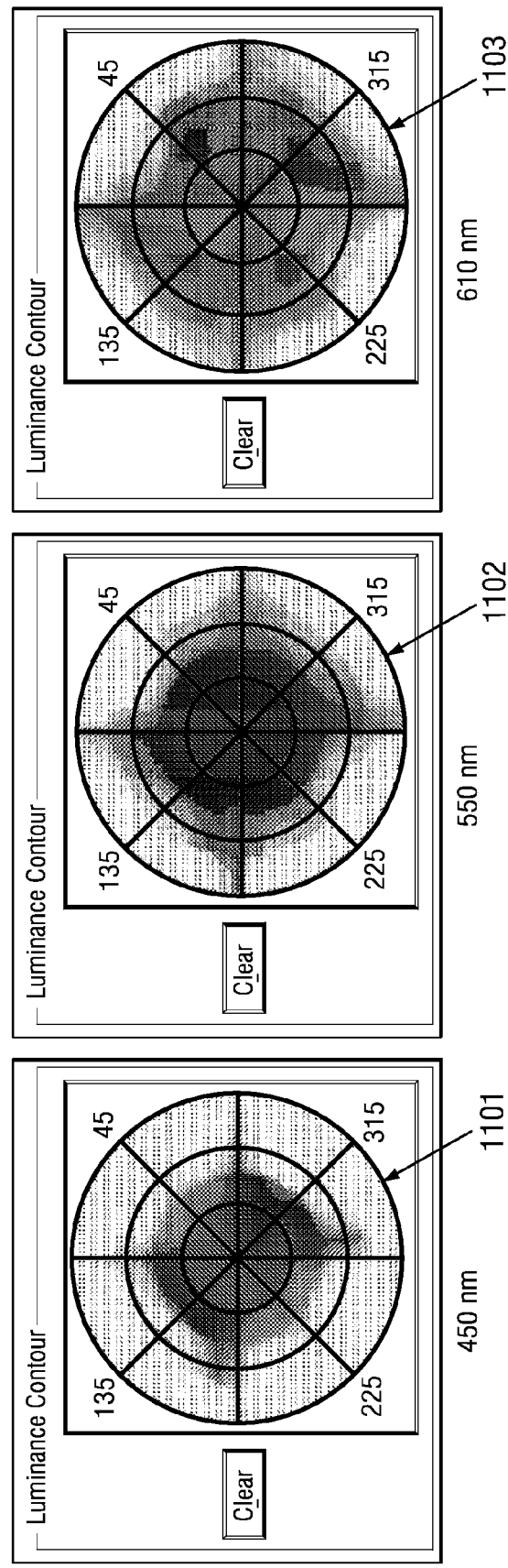
FIG. 11

DOUBLE-SHUTTER LENSES WITH COMPENSATORS

CROSS-REFERENCE TO RELATED APPLICATIONS

This disclosure claims priority to U.S. Provisional Patent Application No. 60/861,709, entitled "High Performance Shutter Glasses for Multifunctional Displays," filed Nov. 30, 2006, which is hereby incorporated by reference herein.

TECHNICAL FIELD

This disclosure relates to 3D displays and, more specifically, to a shutter glass drive scheme for sequential-color stereoscopic-3D displays or other shutter-glass-based displays such as multifunction displays, such as shutter-glass displays for secure-viewing and dual-channel modes.

BACKGROUND

Known stereoscopic 3D shutter glasses use liquid-crystal (LC) pi-cell-based shutter lenses between polarizers. Practical systems include performance limitations stemming from a variety of non-ideal performance characteristics, including viewing angles, spatial uniformity, LC cell switching times, and chromatic response.

SUMMARY

Described in the present application are multiple systems for high-performance double-shutter lens designs, including compensators for compensating for performance problems that stem from real-world performance limitations in present shutter-glass designs. Additional advantages, objects, and features of the disclosure will be set forth in part in the description which follows and in part will become apparent to those having ordinary skill in the art upon examination of the following or may be learned from practice of the disclosure.

BRIEF DESCRIPTION OF THE DRAWINGS

Disclosed embodiments will be described in detail with reference to the following drawings, in which like reference numerals refer to like elements, wherein:

FIG. 9 contains computer modeled polar plots in the Red-Green-Blue or "RGB" bands out to a maximum view angle of 30° for the compensated single-shutter pi-cell lens of FIG. 4, but with the second pair of crossed a-plates removed, in accordance with an embodiment of the invention;

FIG. 10 is a schematic diagram of a double-shutter device, with a neutral sheet polarizer between two liquid-crystal (LC) cells, compensation, and input/output polarizers laminated to the external surfaces of this structure, in accordance with an embodiment of the invention;

FIG. 11 illustrates off-state polar plots for the double-shutter device of FIG. 10, in accordance with an embodiment of the invention;

DETAILED DESCRIPTION

Figure 1:
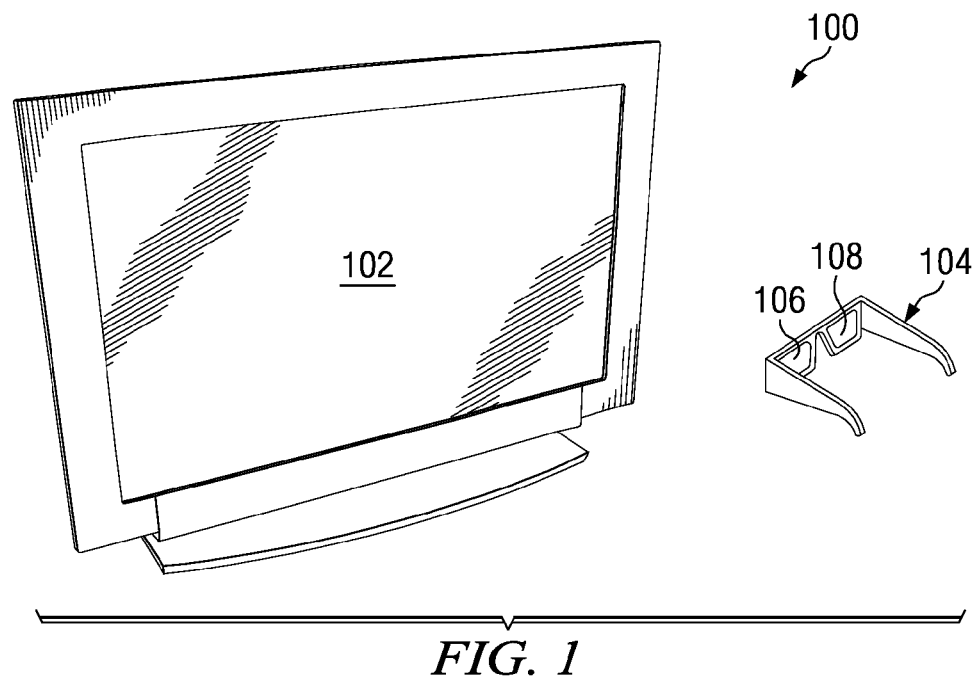
FIG. 1 is a schematic diagram illustrating an exemplary direct-view display system, in accordance with the present disclosure.

FIG. 1 is a schematic diagram illustrating an exemplary direct-view display system 100. The direct-view display system 100 includes a direct-view display 102 and, for viewing some modes, eyewear 104. Stereoscopic 3D is observed using a single direct-view display 102 sequentially displaying left and right perspective imagery, with synchronously operated shutter-glass eyewear 104. Eyewear or shutter glasses 104 are typically liquid-crystal (LC) pi-cell-based shutter lenses 106, 108.

In operation, the left lens 106 passes light, and specifically passes light from the display 102, when the display shows the left image, while the right lens 108 simultaneously blocks the light. Conversely, the right lens 108 passes light when the display 102 shows the right image, while the left lens 106 then simultaneously blocks the light.

The quality of imagery observable through 3D shutter glasses depends upon several LC shutter performance parameters, among them:

(1) Off-state transmission (normal incidence);
(2) Off-state color;
(3) Off-state transmission spatial uniformity;
(4) Off-state transmission angular uniformity;
(5) On-state transmission (normal incidence);
(6) On-state color;
(7) On-state transmission spatial uniformity;
(8) On-state transmission angular uniformity;
(9) Turn-on transition time (0-99%, or 10-90%); and
(10) Turn-off transition time (100-1% or 90-10%).

An ideal shutter would preferably be completely transparent (i.e., would pass 100% of the incoming light) in the on-state, would be completely opaque (i.e., would pass 0% of the incoming light) in the off-state, and would have zero transition time for transitions between its on-state and off-state (and between its off-state and on-state). These conditions are not met in practical systems, so the ultimate lens design is reached by making a number of compromises according to design choices.

The following discussion pertains generally to shutter devices that have passive polarizing sheets that are used in combination with a liquid crystal active switching device. Typically, the polarizers are crossed and are placed on opposing sides of the LC device ("bounding polarizers"). The shutter devices may also include the passive "compensation" layers. The following reviews these parameters as they relate to the structure, manufacturing, and drive scheme.

Off-State Transmission

Typically the off-state of an LC shutter is generated when the LC molecules (effective optic axis) are oriented along the direction of normally incident light (regardless of LC recipe and drive scheme) and the bounding polarizers are crossed. In the event that all molecules cannot be oriented along this z-direction, a polarization transformation occurs on normally incident light which limits contrast. This is generally termed "residual in-plane retardation." Depending upon LC mode and/or drive voltage limitations, this term can permit contrasts of several thousand to one for self-compensating configurations (e.g. an energized 90-degree Twisted Nematic (TN) cell or an un-driven twisted Vertically Aligned (VA) cell) but can also limit contrast to less than 50:1 (as in a pi-cell). The contrast ratio further depends upon the maximum available drive voltage.

The other parameter that can significantly affect off-state transmission is the quality (polarizing efficiency) of the sheet polarizer. Ultimately, the maximum possible contrast is determined by (and inversely proportional to) the leakage of the crossed polarizers alone (assuming an unpolarized input).

Other parameters that can influence off-state transmission include scatter, and stray reflections from poor index matching of surfaces.

Off-State Color

Off-state color can result from the wavelength dependence of sheet polarizers. A sheet polarizer has a certain wavelength-dependent polarization efficiency, which typically gives a bluish hue in the selected polarizations. Off-state color can also be caused by residual in-plane cell retardation. As with the polarizer-induced hue, the off-state color from the residual in-plane cell retardation also intends to provide a blue hue. Together then, the practical off-state color tends to provide a pronounced blue spectral region in the light passing through the LC shutters.

Off-State Transmission Spatial Uniformity

A device constructed of homogeneous materials will provide spatial uniformity. In practice, practical manufacturing issues can drive inhomogeneous materials, which can drive spatial non-uniformity of contrast and/or color.

Off-State Transmission Angular Uniformity

This is commonly associated with field-of-view. As discussed above, the cell is not isotropic in the off-state, but rather has significant z-retardation resulting in a contrast ratio that depends upon ray direction. Assuming a pure z-retardation (which is usually only approximately the case), the optic axis orientation tends to follow the plane of incidence. This retardation has no effect in the incidence plane containing either polarizer, because the projection of the optic axis is along the polarizer, with most pronounced contrast loss when the projection is in the ±45° azimuth. Note that a small adjustment can be made in view of the negative a-plate associated with typical polarizer TAC substrates. Moreover, in these planes geometrical loss in contrast can also occur, such that the polarizers no longer appear to be crossed, particularly at large incidence angles.

An exception to the above is the case where a negative birefringence replica of the cell compensates the off-state (e.g. discotic LC with splayed structure, such as Fuji wide-view or OCB-mode compensator). In principle, the overall structure can appear completely isotropic for all ray directions in this case, such that only geometrical effects limit contrast. Even geometrical effects can, however, be compensated for through use of a biaxial half-wave retarder.

On-State Transmission

There are several factors that tend to determine overall shutter insertion loss. All of the following losses are in addition to the 50% or more loss associated with the generation of 3D using the sequential scheme. First, the main loss contributor in a DMD-based system is the initial 50% loss required to polarize the shutter lens input. The second contributor is the insertion loss from the pair of sheet polarizers 204, 206. Internal transmission in the green can be as high as 95% from one polarizer, but can drop to about 85% in the blue, giving a total blue loss of 28% (0.85*0.85=0.7225→~28% cumulative loss from both polarizers). Color balancing a blue-starved display in 3D mode, can thus have a significant impact. Third, the LC transmission mode has significant chromaticity, as discussed above. Fourth, ITO (Indium Tin Oxide, which is a typical conductor for LC cells) absorption/reflection of light can cause an additional loss of several percent. Fifth, a lack of antireflection coatings on the LC cell and polarizers can typically result in an additional 8% loss.

On-State Color

This tends to be dominated by the chromatic effects of items 2 and 3 above.

On-State Transmission Spatial Uniformity

This tends to be dominated by manufacturing issues such as LC cell gap uniformity.

On-State Transmission Angular Uniformity

Virtually all LC modes have wavelength dependence in the on-state. Certain variable retarder mode devices (e.g. pi-cells) have the chromatic response of a zero-order half-wave plate, the details of which depend upon center wavelength and birefringence dispersion.

In a particular pi-cell example, a peak center wavelength shift toward the red occurs when the plane of incidence contains the rubbing direction, and a blue-shift occurs when the plane of incidence is in the orthogonal direction. There is relatively little shift in the ±45° azimuth (though there can be some loss in transmission). Note additionally that this shift is greater in magnitude and is in an opposite sense from a simple positive a-plate, due to the pi-cell director profile. Such behavior results in an objectionable non-uniformity in color when viewing a video image.

Turn-On Transition Time (e.g. 0-99% or 10-90%)

In typical pi-cells, shutters are normally white and are driven to the low birefringence state (or off-state). This transition is generally relatively fast, but depends upon electric field level. With sufficiently high field, and a fast LC recipe, this can occur in approximately 100 microseconds at room temperature. It is advantageous that the cell can be rapidly driven to an off-state as a means of avoiding cross-talk.

Turn-Off Transition Time (100-1% or 90-10%)

When the field is removed, the LC molecules relax to the on-state director profile. The response time again depends upon the details of the cell recipe. It further depends upon wavelength, operating temperature, and any applied electric field that can impede relaxation. A well designed pi-cell can relax to the half-wave retardation state in the green band at room temperature in approximately 1 ms (0-99%).

A shutter device need not be pi-cell based. In the absence of compensation, a vertically aligned (VA) cell forms a normally black shutter. As such, the relative characteristic response times are reversed.

Operation of Shutter Glasses with Display Panels

An ideal display panel 102 to be used with the above-described shutter glasses 104 for sequential stereoscopic 3D would preferably provide instantaneous full-frame switching between left and right perspective imagery. Given the reality of shutter glass lenses with finite switching times, the ideal display would preferably further provide a full-frame high contrast blanking function to mitigate cross-talk. Digital-Micromirror-Display (DMD) displays provide excellent switching speeds and high contrast, and therefore such displays typically provide excellent features for use in sequential stereoscopic 3D systems. Such displays are commercially available from many Original Equipment Manufacturers (OEMs) employing Texas Instruments' Digital Light Processing® (DLP®) series DMD technology. Generally, such displays come in both single-chip (sequential color) and three-chip platforms. Single-chip platforms are common in low-cost front projectors and rear projection televisions, while the three-chip platforms are used in higher lumen projectors; particularly digital cinema.

Sequential Color DMD

An aspect of the invention is shutter glass optimization for single-chip DMD systems (or any display that supports the required functionality). DMD systems operate entirely in sequential mode. DMD display chips are extremely fast switching (relative to LCD) binary electromechanical mirror arrays. Gray-level adjustments, color adjustments, resolution enhancements, and in this case, stereoscopic 3D, are all accomplished in the temporal domain. Traditionally, this involves synchronizing the DMD chip to a rotating filter wheel, which contains additive primary color segments (RGB), in some cases subtractive primary segments (Cyan-Magenta-Yellow or "CMY"), and even white or varied hues of the RGB or CMY segments. In some cases, the primary color segments are repeated two or three times on the wheel to increase field rate, which mitigates color-breakup artifacts. Typically, there is a geometrical loss associated with "spoke-time", where the DMD chip provides a blanking function (200 microseconds or more) as the illumination spot transitions between color segments. This represents a duty-cycle loss, which is the ratio of the angular extent of the spot to the angular extent of a segment. In some cases this can be recaptured by displaying a subtractive primary image associated with the additive primaries mixed during the spoke time.

More recently, Light Emitting Diodes (LEDs) have emerged as an alternative to color-wheel modulation to enable DMD-based Rear Projection TVs. Such LED-based systems provide advantageous color-switching speeds relative to color wheel-based systems, as LEDs can switch between colors in microseconds, virtually eliminating "spoke" or transition time, thus eliminating the tradeoff between field rate and duty cycle. Additional advantages may follow from the use of LED-based systems, such as increased color gamut, potential for multi-primary illumination, longer lifetime, and ability to amplitude-modulate the source. Separately or in combination, these features can provide improved visual displays. Such advantages also apply to laser-based illumination systems.

A DMD-based light modulator is operable to maximize usage of light generated by the LED modules, relative to an LCD based modulator, as it does not require polarized light. In 3D stereoscopic display modes, however, the shutter glasses must absorb at least 50% of this light due to the above described switching between left and right images. Ultimately, solid-state lasers may supplant both lamp- and LED-based light sources as the preferred illumination source for DMD-based consumer televisions.

Laser-implemented television designs have the potential to provide the superior brightness and color saturation. Lasers further deliver a polarized output, which for a 3D stereoscopic display may be "preserved" in order to avoid the 50% loss normally occurring at the shutter glass lens. This, however, requires maintaining the polarization through the light engine, and for an RPTV, through fold mirrors, and the screen assembly.

Methods and systems are disclosed herein for optimum shutter glass operation with a single DMD chip which maximizes light throughput. In addition to avoiding shutter-glass light losses that would otherwise be associated with 3D stereoscopic shutter-glass implementations, the optimized drive-schemes described herein are suitable to enable multi-functional displays that include stereoscopic 3D capabilities as well as secure-viewing, and dual-channel modes.

The so-called secure-viewing mode involves the generation of a second image, derived from a primary image, such that the screen appears content-free when viewed without shutter glasses. Alternatively, the second image can be derived to display unrelated content, or a message, such as "secure mode." In this mode, the shutter glasses would only "open" during the primary image viewing times, allowing secure viewing of images.

The dual-channel mode involves sequential display of two independent video images. User 1 wears shutter glasses that open only during even frames, and User 2 wears shutter glasses that open only during odd frames. This mode can be used to allow viewers to watch different channels on the same television. It can also be used in a gaming environment, such that Player 1 and Player 2 can view imagery from their unique perspective, or confidential information superimposed on a common video image. Under a worst case scenario in which User 1 views dark imagery, and User 2 views bright imagery, the degree of isolation required between channels can exceed 10,000:1 in order for User 1 to avoid obvious cross-talk. This is far in excess of the requirements of most 3D video content, where contrasts of 500:1 are typically adequate.

Figure 2:
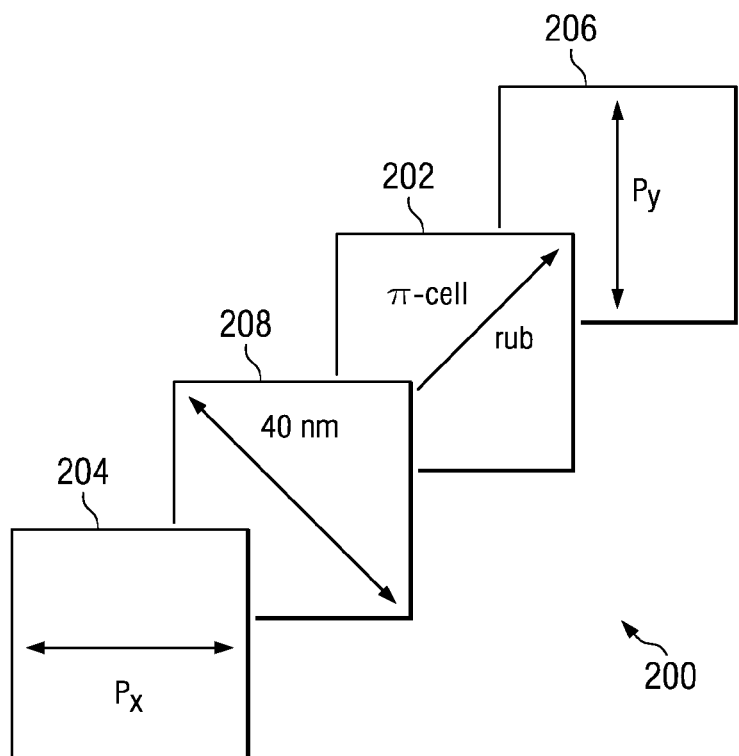
FIG. 2 is a schematic diagram illustrating an exemplary pi-cell shutter, consisting of a pair of crossed polarizers bounding a pi-cell.
Figure 3:
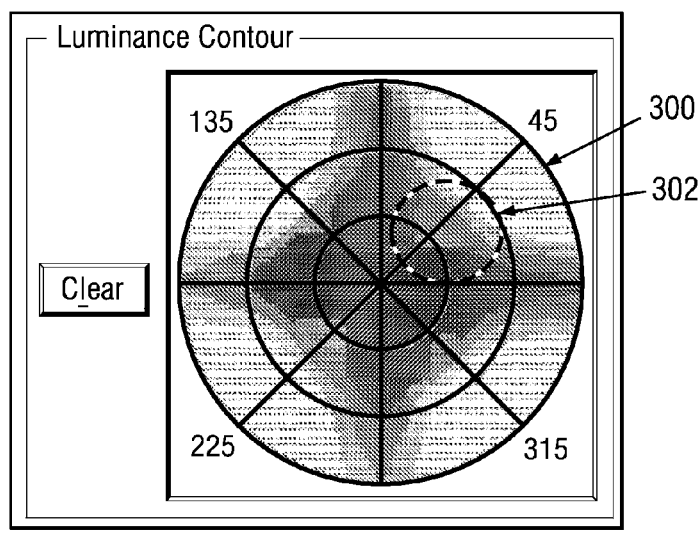
FIG. 3 is an off-state transmission polar plot for the exemplary pi-cell shutter of FIG. 2.

FIG. 2 shows a related art pi-cell shutter lens 200, consisting of a pair of crossed Polarizers 204, 206 bounding a pi-cell 202, rubbed at 45°, and an in-plane 40 nm compensation layer 208. A 4×4 Berremen matrix model is used to obtain off-state transmission polar plots. It assumes ideal polarizers (all-pass along transmission axis, and virtually zero transmission along the absorption axis), the director profile in a typical energized state (16V), a total cell retardation of 1,200 nm, and a 40 nm polycarbonate retardation film. The resulting off-state transmission polar plot 300 is shown in FIG. 3, indicating relatively large leakage 302 in the ±45° azimuth.

Figure 4:
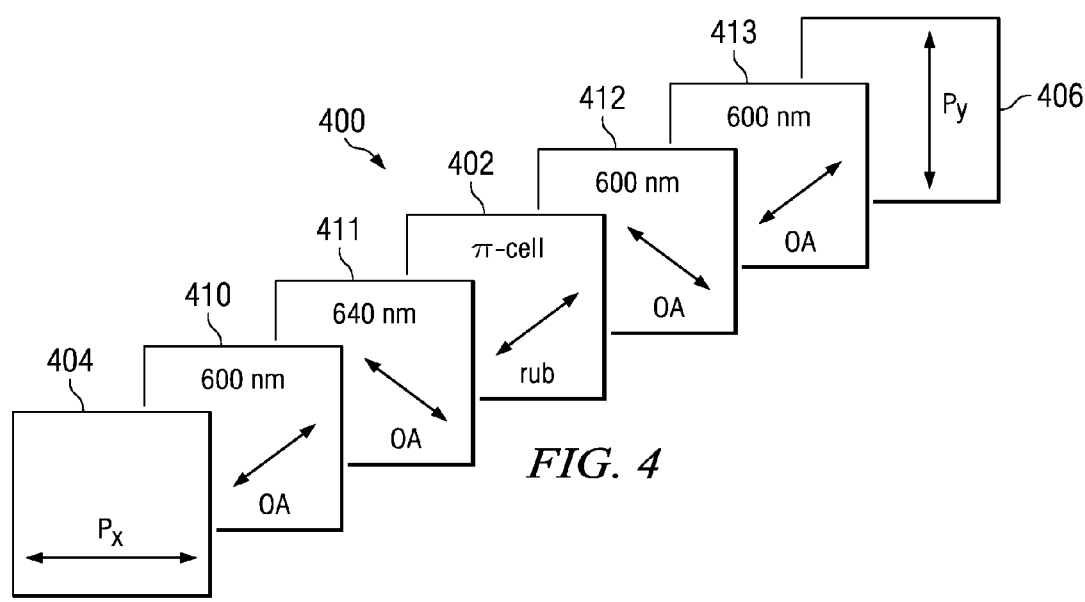
FIG. 4 is a schematic diagram of a single-shutter pi-cell lens compensated with double crossed a-plate layers to maximize the high contrast viewing cone, in accordance with an embodiment of the invention.
Figure 5:
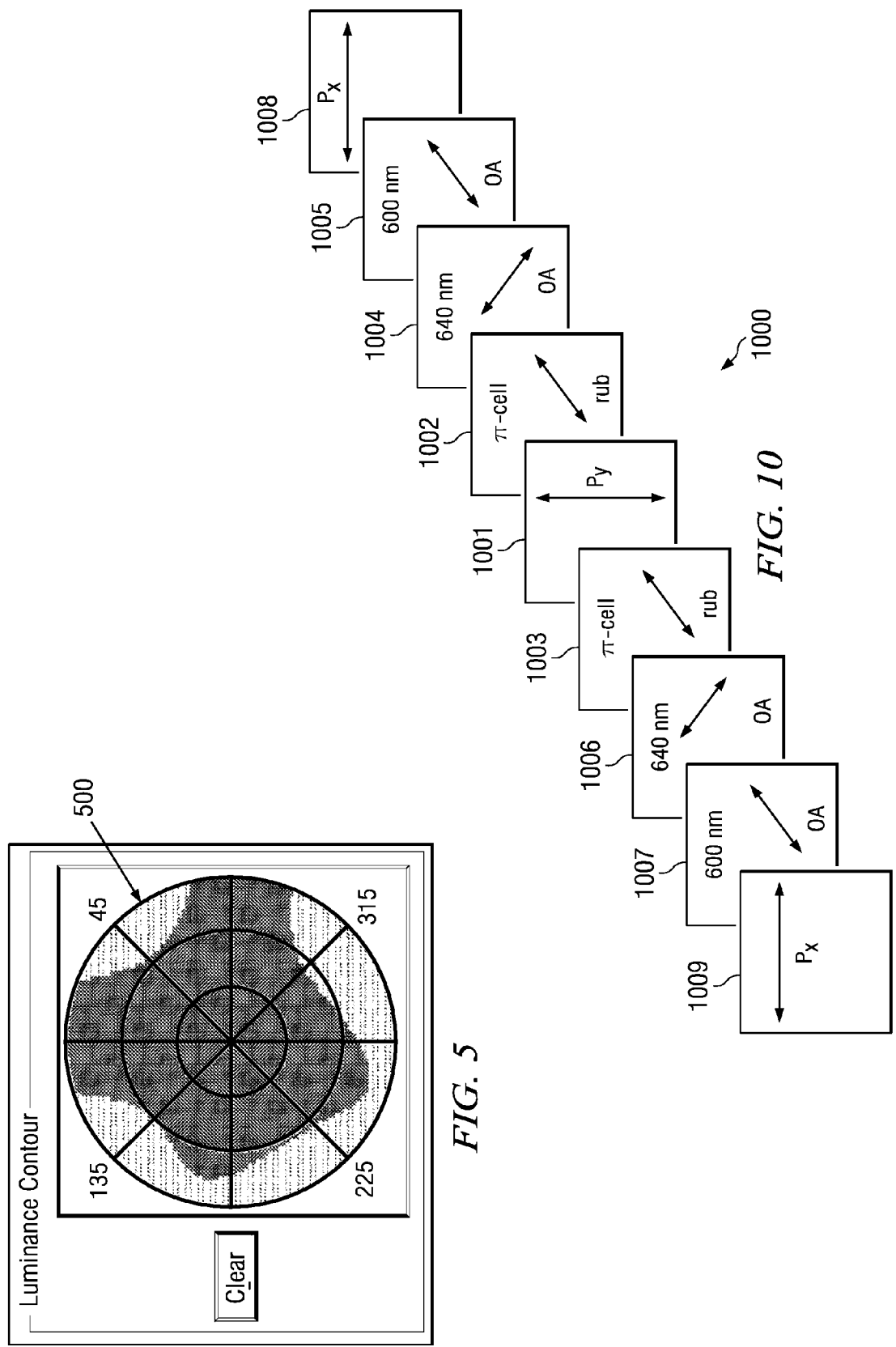
FIG. 5 is an off-state transmission polar plot for the compensated single-shutter pi-cell lens of FIG. 4, in accordance with an embodiment of the invention.

According to one preferred embodiment of the present invention, shown in FIG. 4, a single-shutter pi-cell lens 400 is compensated with double crossed a-plate layers 410-413 to maximize the high contrast viewing cone. The crossed a-plate compensators 410-413 are placed on opposite sides of the pi-cell 402. A pair of polarizers 404 and 406 are placed on opposite sides of the compensators 410-413, bounding the compensators 410-413. Each a-plate has roughly half of the total retardation of the cell (e.g., 600 nm). In one pair, 412 and 413, the retardation of each a-plate is matched. In the other pair, 410 and 411, there is a slight difference, such that the net in-plane retardation is approximately 40 nm and the larger retardation value is crossed with the cell rubbing direction. The corresponding off-state transmission polar plot 500 is shown in FIG. 5, indicating a much improved viewing cone.

Because this shutter is optimized for off-state angular performance, the contrast is maintained above 100:1 out to 20°, and the viewing cone is fairly isotropic. Nevertheless, there is a rapid decline in theoretical contrast with view angle. Moreover, maintaining on-axis contrast above 1,500:1 in manufacturing requires tight tolerances on matching the compensator to the cell. This includes both part-to-part variation, as well as spatial non-uniformity in color and contrast.

Figure 6:
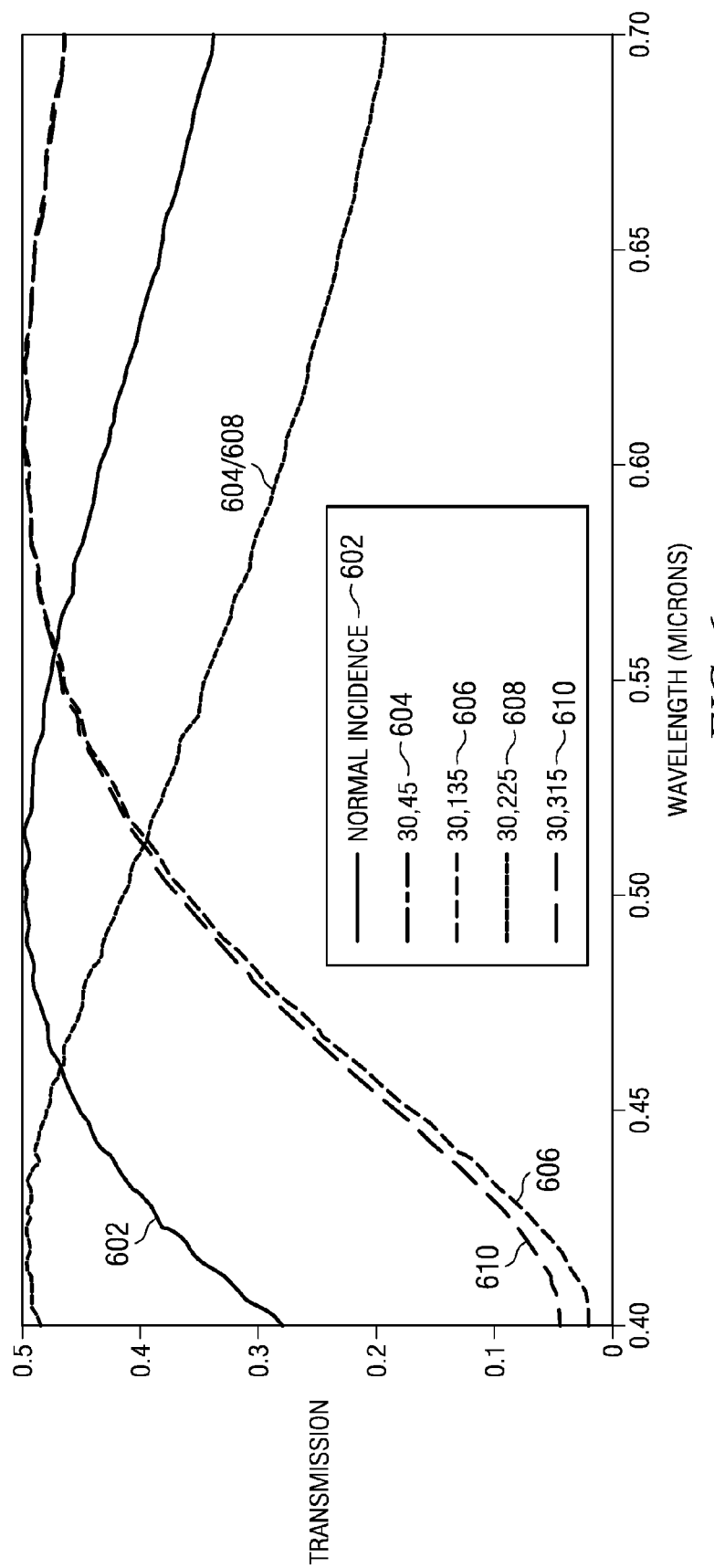
FIG. 6 is a model spectra for the compensated single-shutter pi-cell lens of FIG. 4 at normal incidence and at an incidence angle of 30° for four azimuth angles of 45°, 135°, 225° and 315° in accordance with an embodiment of the invention.

Though off-state transmission angular performance is improved, a consequence of the double crossed a-plate compensator 410-413 is that on-state transmission angular performance is compromised. FIG. 6 shows model spectra at normal incidence 602, and an incidence angle of 30° for four azimuth angles −45°(604), 135° (606), 225° (608) and 315° (610). Again, these azimuth angles were selected because they show the greatest spectral shift. This particular example shows that the peak in transmission red shifts when the plane of incidence contains the rubbing direction, and blue shifts in the orthogonal plane. The shift is opposite that of a positive a-plate (and greater in magnitude) due to the inhomogeneous director profile. A lens of this type would show a bluish colored band in one azimuth, and a yellowish band in the crossed azimuth when viewing the 3D image. The 0/90° azimuth would appear white, much like the center, or normal-incidence view.

Figure 7:
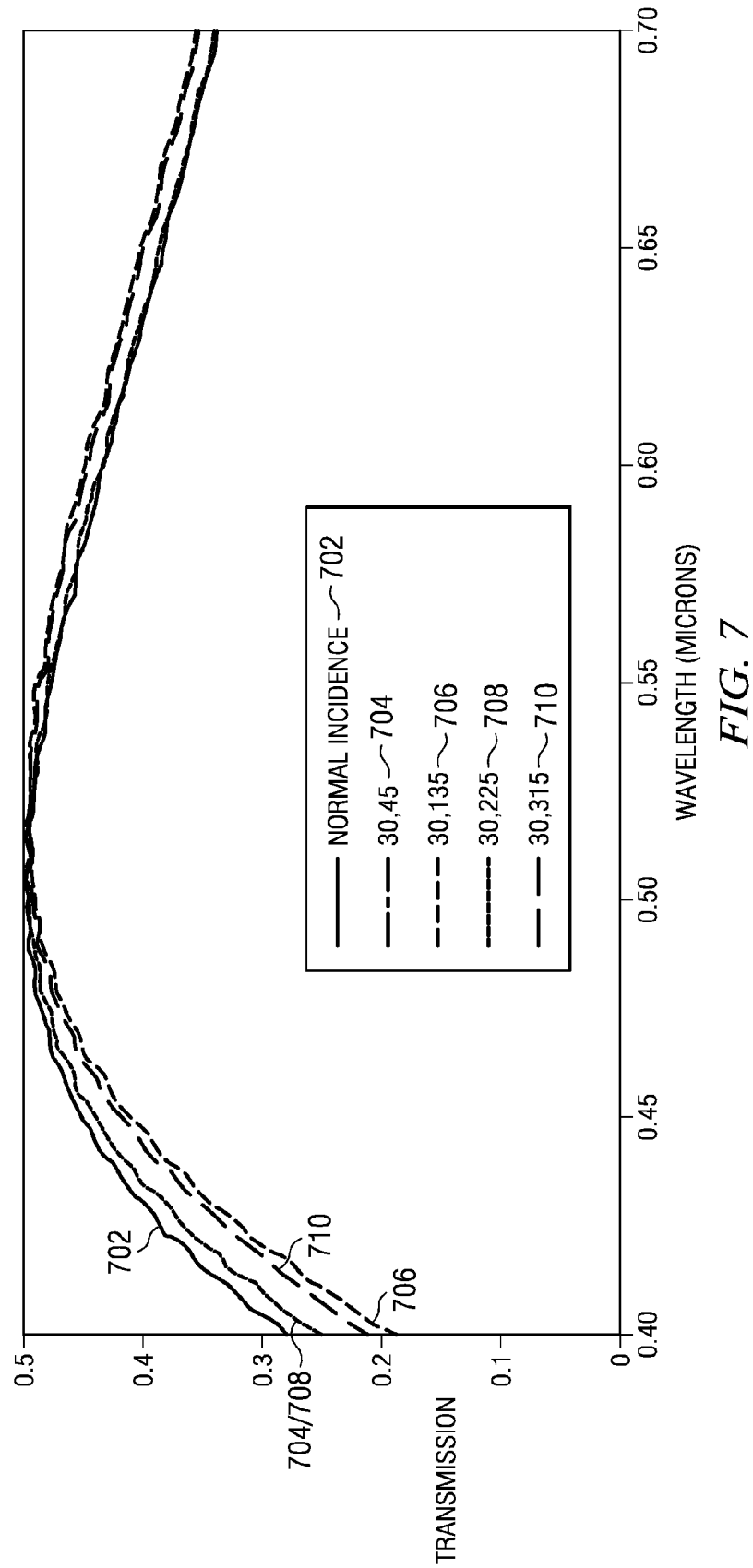
FIG. 7 illustrates plots created by computer modeling of on-state spectral transmission for four azimuth angles for the compensated single-shutter pi-cell lens of FIG. 4 with the second pair of crossed a-plates removed, in accordance with an embodiment of the invention.
Figure 8:
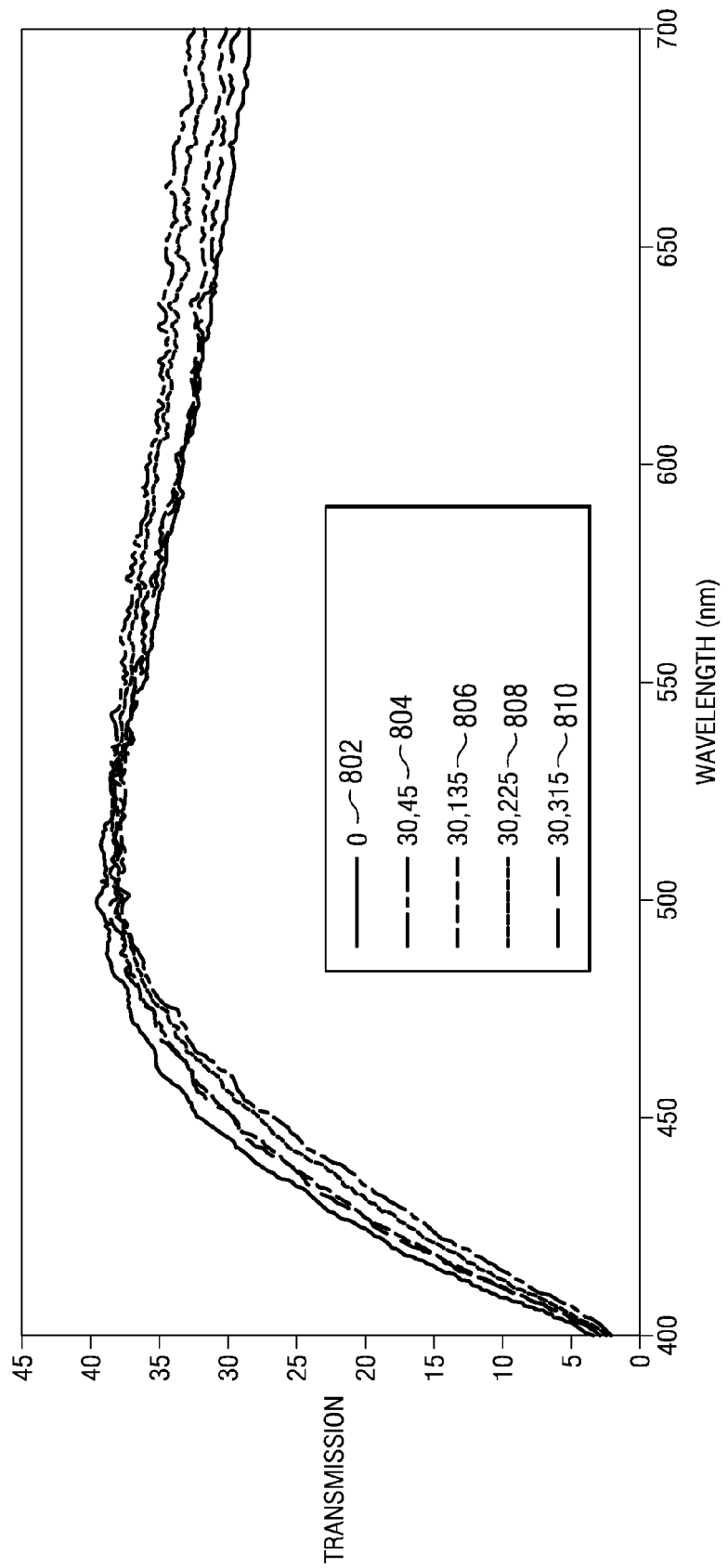
FIG. 8 illustrates plots of the actual measured on-state spectral transmission for the compensated single-shutter pi-cell lens of FIG. 4, but with the second pair of crossed a-plates removed, in accordance with an embodiment of the invention.

Accordingly, a structure is sought which is consistently high in normal incidence contrast, maintains contrast spatially, and maintains contrast to more than 30°, while simultaneously providing uniform angular appearance in the on-state. A building block of this "double-shutter" device (see FIG. 10) is the single shutter stage 400 shown in FIG. 4, but with the second pair of crossed a-plates 412 and 413 (600 nm film) removed. The loss of this second pair of compensators 412 and 413 has an impact on off-state transmission angular performance, but there is an enormous benefit to on-state transmission angular uniformity. FIG. 7 shows computer modeling of on-state spectral transmission at normal incidence 702 and for four azimuth angles (45° (704), 135° (706), 225° (708), and 315° (710)), which can be directly contrasted with the spectra of FIG. 6. Moreover, this single shutter was fabricated and tested, with spectra shown in FIG. 8, confirming that there is very little spectral shift with this compensation scheme. FIG. 8 shows the spectral transmission at normal incidence 802 and for four azimuth angles (45° (804), 135° (806), 225° (808), and 315° (810)).

As mentioned above, the single crossed a-plate compensation scheme compromises the angular performance in the off-state. Computer model polar plots in the RGB bands out to a maximum view angle of 30° confirm this in FIG. 9. However, this is tolerable because the transmission response of the double-shutter device is essentially squared, resulting in extremely high normal incidence contrast (greater than 10,000:1), and much larger high-contrast viewing cone. FIG. 10 shows a configuration for the double-shutter device 1000, which places a neutral sheet polarizer 1001 between the two LC cells 1002 and 1003, with compensators 1004-1007 and input/output polarizers 1008, 1009 laminated to the external surfaces of this structure. The off-state polar plots 1101-1103 of the double shutter device 1000 are shown in FIG. 11, confirming that exceptional contrast is maintained to angles much larger than is practical with a single-stage shutter.

A practical benefit is that the double-shutter device relaxes many of the manufacturing issues associated with the tedious task of precise in-plane compensation. Tolerances in manufacturing can result in a variation of compensator value of several nanometers. In a single-shutter lens, this can cause a variation of optimized contrast voltage of several volts. Another factor influencing part-to-part variation in optimized normal incidence contrast is the precision in orienting the polarizers and compensator to the LC device. Such issues, including off-state transmission uniformity, are virtually eliminated by the squared-response of the double-shutter.

Though modest, there is an additional transmission loss associated with the double shutter. This is dominated by the loss of an additional polarizer, and the ITO loss of an additional cell. Using high performance iodine polarizers, this loss is 5-6% in the green. A compromise solution enabled by the double shutter is to use one or more polarizers with higher transmission, and lower polarizing efficiency (e.g. a 200:1 contrast polarizer with 97% transmission). The average absorption/reflection loss of a cell using 100 ohm ITO typically contributes an additional 2-4% loss.

Figure 12:
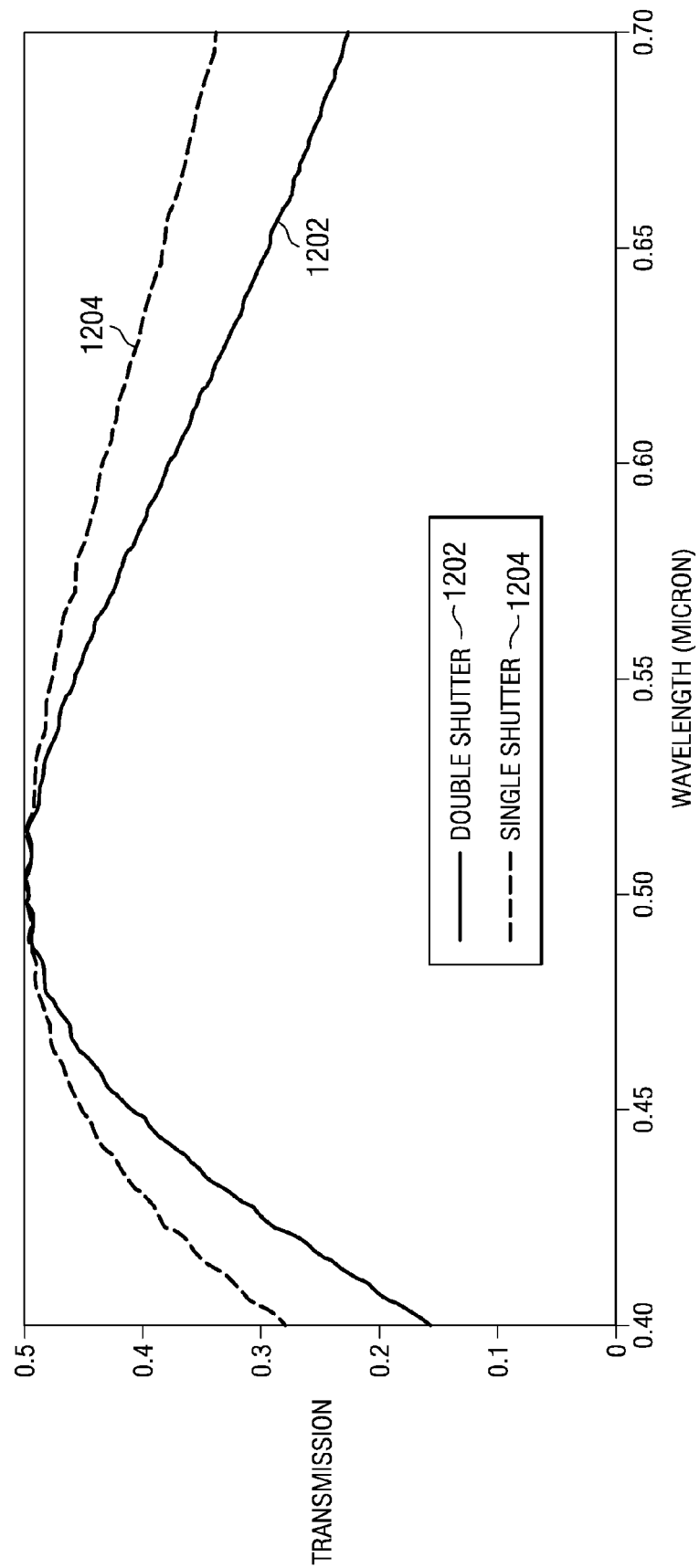
FIG. 12 is a plot of on-state transmission for a single-shutter device and a double-shutter device, in accordance with an embodiment of the invention.

Compensation is selected to maximize the normal incidence off-state transmission, but perhaps more importantly, to compensate the on-state transmission angular uniformity. In a preferred arrangement, while the shutter lens has a chromatic response in the on-state, it is virtually unchanged with ray angle/azimuth. This is particularly important with double shutter lenses 1202, which have an enhanced on-state chrominance, as shown in FIG. 12. The on-state chrominance of single shutter lenses 1204 is also shown in FIG. 12.

Figure 13:
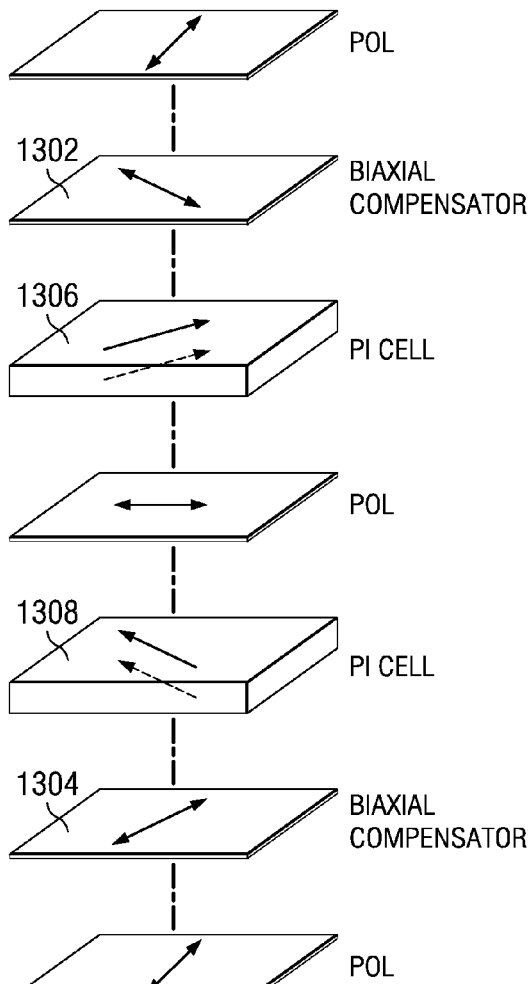
FIG. 13 is a schematic diagram of a double-shutter device having a single biaxially-stretched compensator (large Nz factor, where Nz=(nx−nz)/(nx−ny)) in place of the crossed a-plate compensation, in accordance with an embodiment of the invention.
Figure 14:
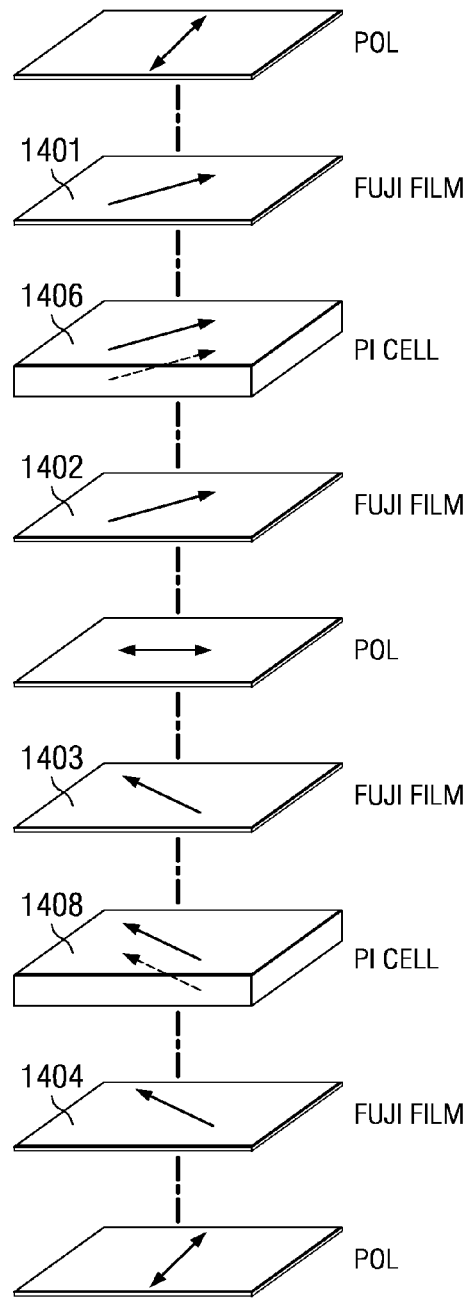
FIG. 14 is a schematic diagram of a double-shutter device using pi-cells compensated with discotic LC layers, in accordance with an embodiment of the invention.
Figure 15A:
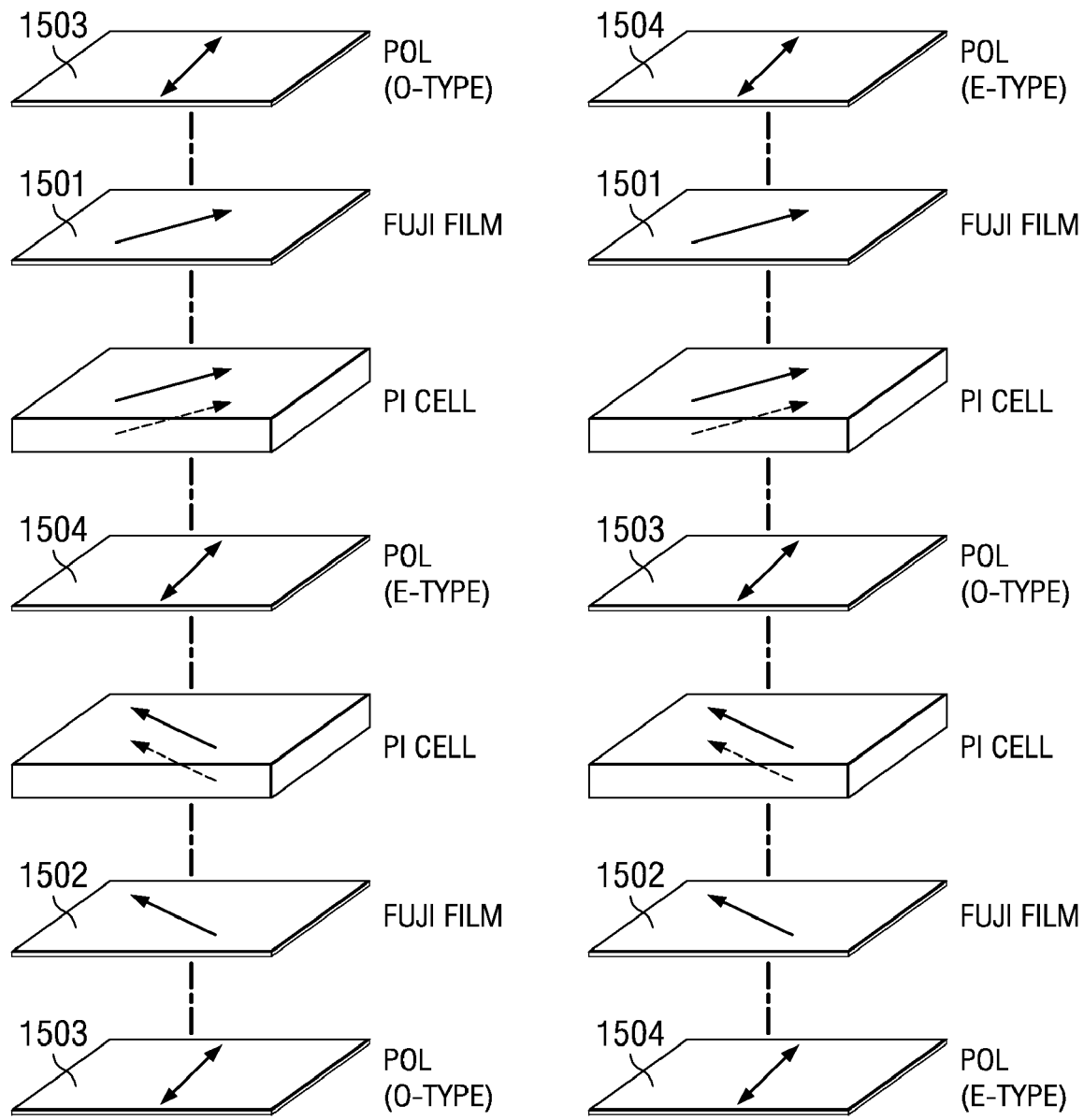
FIGS. 15A and 15B area schematic diagrams of additional double-shutter devices, in accordance with embodiments of the invention.
Figure 15B:
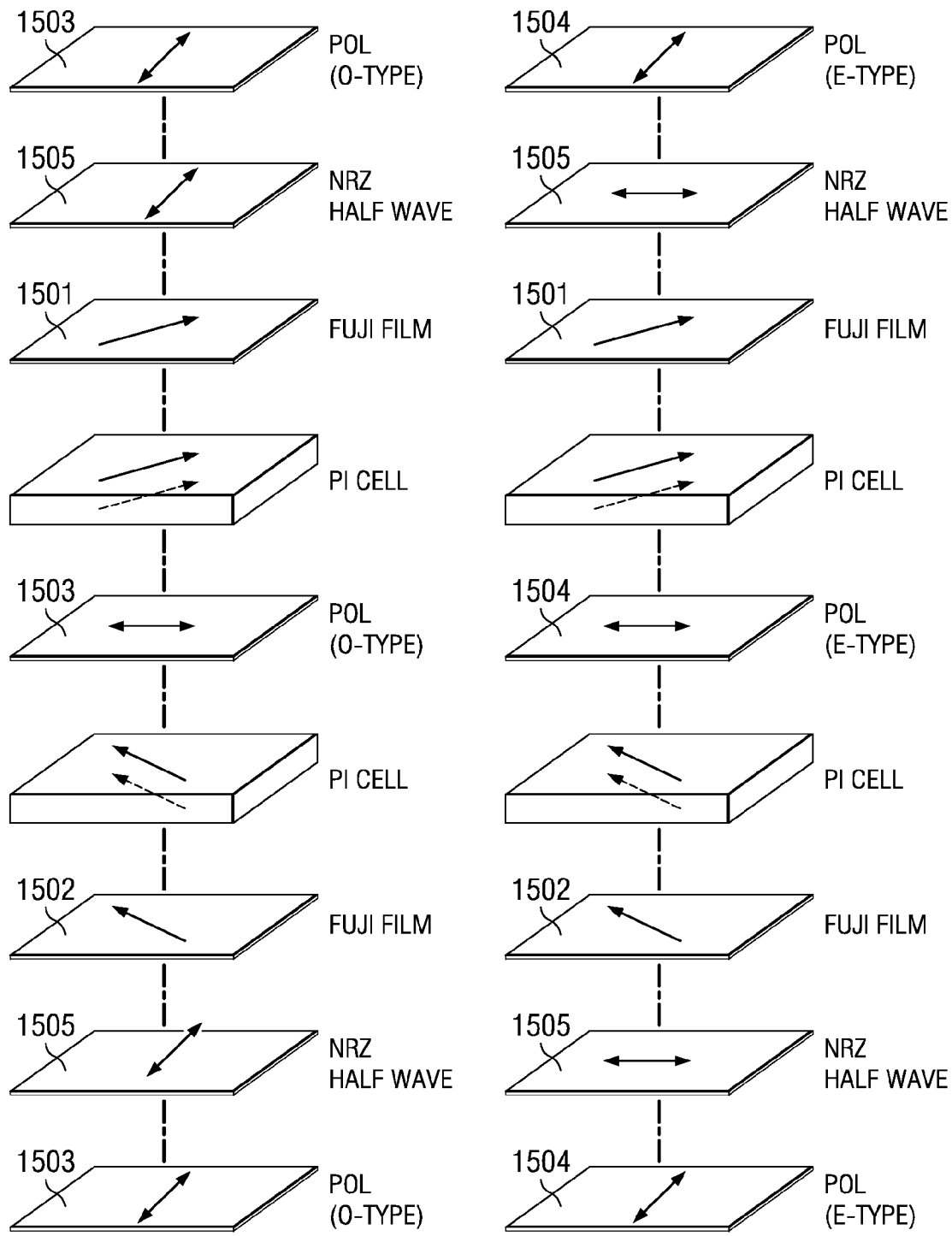

Other double-shutter configurations are shown in FIGS. 13-15. FIG. 13 shows a single biaxially-stretched compensator 1302 and 1304 (large Nz factor, where Nz=(nx−nz)/(nx−ny)) in place of the crossed a-plate compensation. Here, the pi-cells 1306 and 1308 are shown with crossed rubbing directions. FIG. 14 is the embodiment of a double-shutter device using pi-cells 1406 and 1408 compensated with discotic LC layers 1401-1404 discussed previously. Again, the rubbing directions are crossed in this case. Additional configurations (FIGS. 15A and 15B) include combinations of discotic LC compensators 1501 and 1502 with ordinary-mode 1503 and extraordinary-mode 1504 polarizers to handle geometrical issues with typical crossed polarizers. Alternatively, biaxial (Nz=0.5) half wave films 1505 can be placed between conventional polarizers to accomplish a similar result.

The foregoing embodiments and advantages are merely exemplary, and are not to be construed as limiting the present invention. The present teaching can be readily applied to other types of apparatuses. The description of the present invention is intended to be illustrative. Many alternatives, modifications, and variations will be apparent to those skilled in the art. Various changes may be made without departing from the spirit and scope of the present invention.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. Further, where laminated structures are illustrated, the order of the laminating layers may be rearranged according to design needs as would be understood by the artisan. These and other variations, modifications, additions, and improvements may fall within the scope of the invention as defined in the claims that follow.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background of the Invention" is not to be construed as an admission that technology is prior art to any invention(s) in this disclosure. Neither is the "Brief Summary of the Invention" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A shutterglass lens operable to pass temporally modulated display images, the shutterglass lens comprising:
    a liquid crystal (LC) cell;
    a first optical compensator; and
    a second optical compensator;
    wherein the LC cell is bounded by the first and second optical compensators, and wherein at least one of the first and second optical compensators comprise a pair of crossed a-plates, and wherein at least one of the first and second optical compensators comprises a pair of a-plates, with a first a-plate having retardation of substantially half of the retardation of the LC cell and the second a-plate having retardation greater than the first a-plate.

2. The shutterglass lens of claim 1, wherein the LC cell is a pi-cell.

3. The shutterglass lens of claim 1, wherein at least one of the first and second optical compensators comprises a pair of a-plates, both a-plates having substantially similar retardation values.

4. The shutterglass lens of claim 1, wherein the second a-plate has an optical axis that is substantially orthogonal to a rubbing direction of the LC cell.

5. The shutterglass lens of claim 1, further comprising an entry polarizer having a first optical axis and an exit polarizer having a second optical axis, wherein the first optical axis is oriented orthogonal to the second optical axis.

6. A shutterglass lens operable to pass temporally modulated display images, the shutterglass lens comprising:
    a pi cell;
    a first pair of a-plates comprising a first a-plate and a second a-plate, wherein the first a-plate is adjacent a first side of the pi cell and the second a-plate is adjacent the first a-plate;
    a second pair of a-plates comprising a third a-plate and a fourth a-plate, wherein the third a-plate is adjacent a second side of the pi cell and the fourth a-plate is adjacent the third a-plate;
    wherein the first and second a-plates have substantially orthogonal optical axes, and wherein the third and fourth a-plates have substantially orthogonal optical axes, and wherein the pi cell has a cell rubbing direction, and wherein the first and third a-plates have an optical axis orthogonal to the cell rubbing direction, and wherein the second and fourth a-plates have an optical axis aligned with the cell rubbing direction.

7. The shutterglass lens of claim 6, wherein the first and second a-plates have substantially similar retardation, and wherein the third and fourth a-plates have different retardation values from each other.

8. The shutterglass lens of claim 6, wherein the first, second and fourth a-plates each have a retardance around 600 nm, and wherein the third a-plate has a retardance around 640 nm.

9. The shutterglass lens of claim 6, further comprising a first polarizer having a first optical axis and a second polarizers having a second optical axis, wherein the first polarizer is adjacent the second a-plate, wherein the second polarizer is adjacent the fourth a-plate, and wherein the first optical axis is orthogonal to the second optical axis.

* * * * *